United States Patent [19]

Matsushima

[11] Patent Number: 4,867,926
[45] Date of Patent: Sep. 19, 1989

[54] METHOD FOR MANUFACTURING OIL SEAL

[75] Inventor: Noboru Matsushima, Fukushima, Japan

[73] Assignee: NOK Corporation, Tokyo, Japan

[21] Appl. No.: 61,516

[22] Filed: Jun. 15, 1987

[30] Foreign Application Priority Data

Jun. 16, 1986 [JP] Japan .................. 61-139753

[51] Int. Cl.⁴ .................. B29C 43/22; B29C 43/04
[52] U.S. Cl. .................. 264/154; 264/127; 264/139; 264/262; 264/268; 277/134; 277/152; 277/153
[58] Field of Search .......... 264/262, 268; 277/134, 277/152, 153

[56] References Cited

U.S. PATENT DOCUMENTS

| | | | |
|---|---|---|---|
| 4,300,777 | 11/1981 | Symont .................. | 277/134 |
| 4,406,847 | 9/1983 | O'Neal et al. .......... | 264/262 |
| 4,464,322 | 8/1984 | Butler .................. | 264/262 |

Primary Examiner—James Lowe
Attorney, Agent, or Firm—Armstrong, Nikaido, Marmelstein, Kubovcik & Murray

[57] ABSTRACT

A lip-type oil seal for use with a rotary shaft is manufactured by a method wherein different elastomeric materials for forming respectively the sealed liquid side and the atmospheric side of a tip portion of a sealing lip of the oil seal have different moduli of elasticity or hardnesses and are placed in a superposed condition within a mold prepared for vulcanization molding the oil seal. The mold is then clamped and the materials are heated and compressed so that an elastomeric material is fluidized and is vulcanization molded together with the other material to form an integral structure while a surplus portion is allowed to remain on the atmospheric side, thereby forming a sealed liquid side surface of the sealing lip. After the fluidized material has been hardened, the mold is opened and the surplus portion is then cut off, thereby forming an atmospheric side surface of the sealing lip.

4 Claims, 3 Drawing Sheets

METHOD FOR MANUFACTURING OIL SEAL

BACKGROUND OF THE INVENTION

The present invention relates to a method of manufacturing an oil seal in which a sliding surface of a rotary shaft consists of different elastomeric materials having different moduli of elasticity or hardnesses so that a hydrodynamic pumping action is provided by making use of the deflection of a sealing surface that is caused by rotation of the rotary shaft.

FIG. 1 shows an example of a conventional oil seal of this kind, as disclosed in U.S. Pat. No. 4,300,777. In this prior art reference, an oil seal generally designated at 100 has a metallic ring 100a having a generally L-shaped section, and a sealing lip 101 which is made of an elastomeric material is integrally bonded to the radial inner edge of the metallic ring 100a and extends to a sealed liquid side (i.e., to the right side as viewed in FIG. 1). The sealing lip 101 has a lip tip portion 102, and a side surface which is on the sealed liquid side of the lip tip portion 102 is provided with a different material layer 103 made of an elastomeric material which is different from the material of the sealing lip 101. Thus, a sliding surface 105 which is in sealing contact with a shaft 104 is formed by first and second sliding surfaces 106 and 107 which are made of different rubbery materials. More specifically, the first sliding surface 106 is made o an elastomeric material having a lower modulus of elasticity than that of another elastomeric material employed for the second sliding surface 107. Therefore, when the shaft 104 is rotating, the sliding surface 105 is pulled in the direction of rotation of the shaft, with each of the first and second sliding surfaces 106 and 107 being deflected from the axial direction to a helical angle of 0, as shown in FIG. 2, due to the difference in modulus of elasticity. This deflection gives a certain inclination to fine projections on the surface of the sliding surfaces 106 and 107 to provide a hydrodynamic pumping action.

With respect to methods of manufacturing an oil seal of this kind, it is possible to adopt a method comprising molding the sealing lip 101 in a known manner and thereafter providing the different material layer 103 on the sealed liquid side surface of the lip tip portion 102, for instance, by bonding. This method, however, may result in an increase in the number of processes. In order to obtain a reduction in the number of processes, it is possible to adopt another method comprising vulcanization molding the sealing lip 101 and a different elastomeric material within a mold to form an integral structure. An example of this method of vulcanization molding different materials within a mold to form an integral structure is the method disclosed in Japanese Patent Publication No. 23681/1971, which is shown in FIGS. 3 and 4. This prior art discloses a method of molding a layer of a fluorine-containing-resin on a sliding surface of a sealing lip to form an integral structure, which comprises the steps of placing an elastomeric material 111 and a fluorine-containing-resin 112 within a mold 110 in a superposed condition, compression molding the material 111 and the resin 112 to form an integral structure in which a fluorine-containing-resin layer 112a is provided on the atmospheric side surface of the lip tip portion 102, and, after the compacted structure has been taken out of the mold, cutting, along the line C—C shown in FIG. 4, a surplus portion 113 that extends to the sealed liquid side of the lip tip portion 102.

Although this conventional method enables different materials to be molded to form an integral structure, the method means that the sliding surface 105', which is formed by cutting the surplus portion 113 after vulcanization molding, is formed solely by a layer 103' of the second material, i.e., the resin, as shown in FIG. 5, thus failing to obtain a sliding surface 105' formed of two different materials. In order to compensate for this drawback, the lip tip portion 102 may be cut in the axial direction along a line D—D shown in FIG. 5 by means of a knife or scalpel so that the sliding surface 105' will be formed of two different materials. This operation, however, requires highly precise control of the amount to be cut off from the lip tip portion 102 in order to prevent any variation in the respective widths W1 and W2 of the sliding surfaces 106' and 107', particularly a variation in the width W1 of the sliding surface 106' on the sealed liquid side, because such a variation may cause variation in the deflection amount of the sliding surface during rotation of the shaft when the oil seal is used, and accordingly, variation in the hydrodynamic pumping action. In this respect, it is difficult to form the sliding surfaces properly.

Even if the the sliding surface 106' on the sealed liquid side is formed to have a predetermined value of the width W1, this width W1 may increase after a long period of use as wear of the surface proceeds. This increase in the width W1 of the surface on the sealed liquid side causes an increased amount of deflection during rotation of the shaft, resulting in an increase in the degree of suction to which an external fluid is subjected by the hydrodynamic pumping action and accordingly insufficient lubrication of the sliding surface 105', hence leading to various problems including seizure.

SUMMARY OF THE INVENTION

An object of the present invention is to provide an oil seal manufacturing method which allows the sliding surface consisting of different materials to be formed with a predetermined width in a simple manner so as to obtain an optimum reduction in variations in the sealing performance of the oil seal manufactured by the method, thereby solving the problems of the prior art.

Another object of the present invention is to provide an oil seal manufacturing method which is adapted to form a side surface on the sealed liquid side of a tip portion of a sealing lip of the oil seal by vulcanization molding the sealing lip tip portion using different elastomeric materials respectively on the sealed liquid side and the atmospheric side of the sealing lip tip portion to form an integral structure, allowing a surplus portion to remain on the atmospheric side, and to form an atmospheric side surface of the sealing lip portion by cutting off the surplus portion on the atmospheric side after the vulcanization molding.

A further object of the present invention is to provide an oil seal manufactured by the above-mentioned manufacturing method.

The above-mentioned objects and other objects of the present invention are achieved by an oil seal manufacturing method comprising the steps of preparing a mold for vulcanization molding an oil seal, placing different elastomeric materials for forming respectively a sealed liquid side of a tip portion of a sealing lip of the oil seal and an atmospheric side thereof in a superposed condition within the mold, forming a sealed liquid side surface of the sealing lip by clamping the mold and vulcanization molding the elastomeric materials into an integral structure while allowing a surplus portion to remain on the atmospheric side, and forming an atmospheric side surface of the sealing lip portion by cutting off the surplus portion after compression of vulcanization and taking out the oil seal from the mold.

DETAILED DESCRIPTION OF THE PREFERRED EMBODIMENT

The present invention will now be described with reference to the accompanying drawings.

Figure 1:
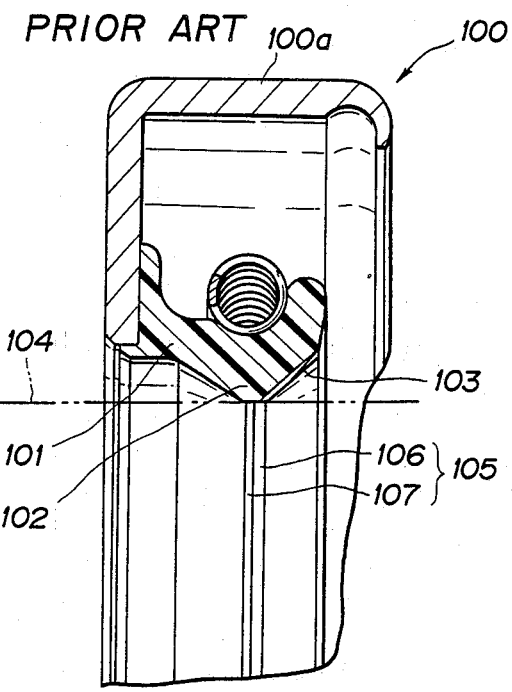
FIG. 1 is a longitudinal sectional view through essential parts of a conventional oil seal.
Figure 2:
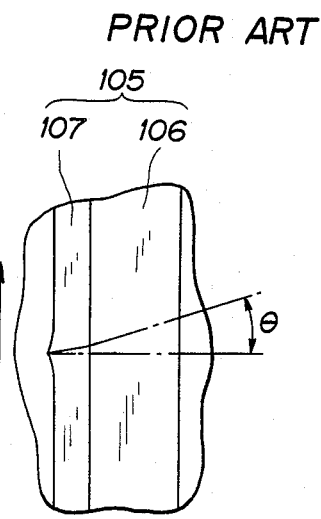
FIG. 2 is a schematic explanatory view of a sliding surface at the lip tip portion of the conventional oil seal of FIG. 1, showing the surface condition during sliding of a shaft on the surface.
Figure 3:
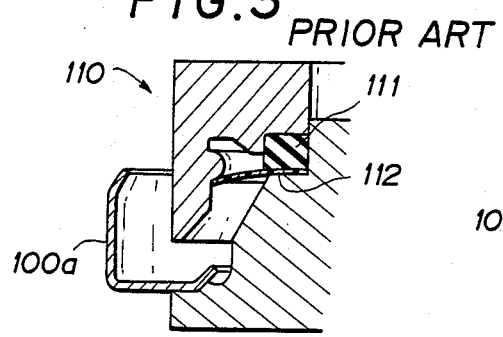
FIGS. 3 and 4 are longitudinal sectional views showing a conventional method of molding different materials into an integral structure within a mold.
Figure 4:
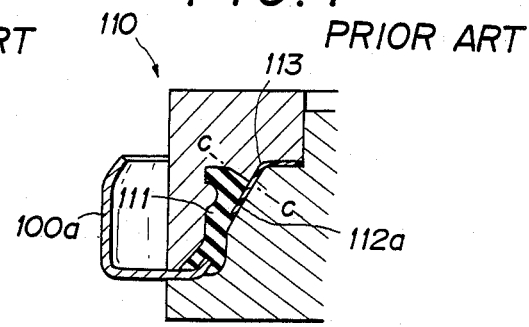
Figure 5:
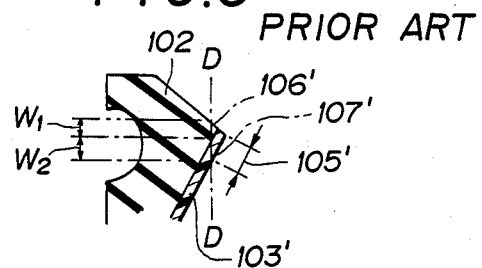
FIG. 5 is a longitudinal sectional view through a lip tip portion of a sealing lip molded by the conventional method.
Figure 6:
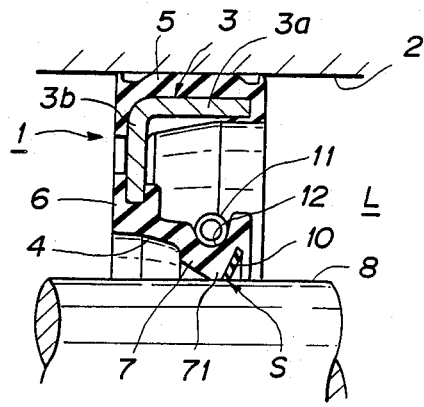
FIG. 6 is a longitudinal sectional view through essential parts of an oil seal manufactured by an oil seal manufacturing method in accordance with the present invention.

FIG. 6 shows an oil seal manufactured by an oil seal manufacturing method in accordance with the present invention. Generally designated at 1 is an oil seal of the type provided on its outer periphery with a piece of rubber and also provided with a spring. The oil seal 1 comprises a metallic ring 3 which is fitted within a housing 2 and has a generally L-shaped section, and a sealing lip 4 which is made of an elastomeric material and extends from the inner edge of the metallic ring 3 to the side of sealed liquid L. The metallic ring 3 comprises a cylindrical portion 3a and a flange portion 3b extending radially inward from the atmospheric side end of the cylindrical portion 3a. The outer periphery of the cylindrical portion 3a is provided with an outer periphery rubber portion 5 which is bonded thereto and is integral therewith for providing a seal between the housing 2 and the ring 3 fitted therein. The atmospheric side surface of the flange portion 3b is also provided with a rubber portion 6 which covers a portion of that surface.

Figure 7:
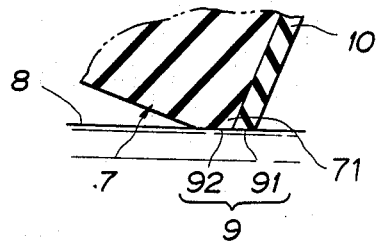
FIG. 7 is an enlarged longitudinal sectional view through essential parts of a lip tip portion of the oil seal of FIG. 6.
Figure 8:
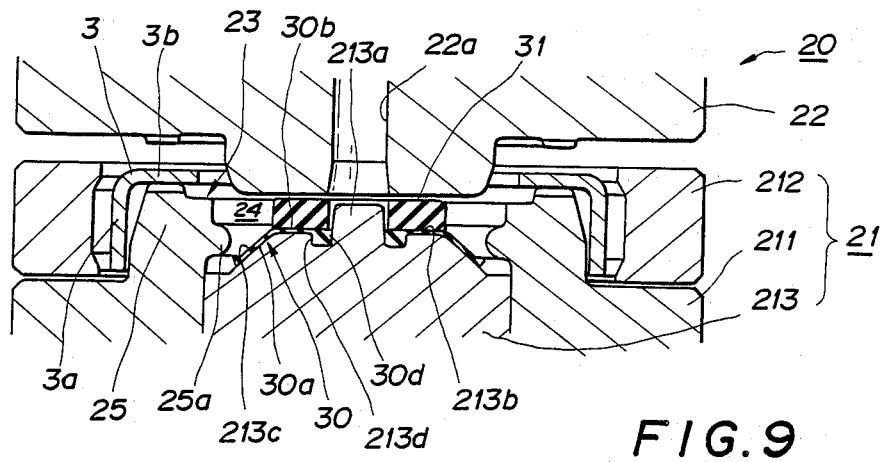
FIG. 8 is a longitudinal sectional view through essential parts of a mold within which elastomeric materials are placed.

The sealing lip 4 has a lip tip portion 7 which is in sealing contact with a rotary shaft 8 and forms a sealing portion S. The central portion of the lip tip portion 7 projects radially inward in a generally triangular shape, and, as shown in an enlarged view in FIG. 7, this projection 71 is in sliding contact with the rotary shaft 8 to form a sliding surface 9. A different material layer 10 which is made of an elastomeric material which is different from that of the sealing lip is formed on the sealed liquid side surface of the lip tip portion 7 to form an integral structure with the sealing lip. More specifically, this different material layer 10 is provided on the sealed liquid side surface of the lip tip portion 7 in such a manner as to extend to the tip of the projection 71 of the lip tip portion 7. In addition, the sliding surface 9 of the lip tip portion 7 which is adapted to allow the rotary shaft 8 to slide thereon consists of first and second sliding surfaces 91 and 92 which are formed of different elastomeric materials. A spring received in a spring recess 12 formed on the outer periphery of the lip tip portion 7 is designated at 11.

FIGS. 8 to 13 show the illustrations for explaining oil seal manufacturing steps in accordance with an embodiment of the present invention. FIGS. 8 to 11 show a process of vulcanization molding the above-described sealing lip 4. A mold 20 used in the vulcanization molding generally comprises a lower mold half 21 and an upper mold half 22. The upper surface of the lower mold half 21 has an annular recess 23 to form a cavity 24 in cooperation with the lower surface of the upper mold half 22. The lower mold half 21 is divided into three sections and comprises an annular main section 211 of the lower mold half having a projection 25 on which the metallic ring 3 is placed when the ring is inserted into the cavity 24, an annular split section 212 of the lower mold half which is used in molding the outer periphery rubber portion 5, and a core section 213 which is fitted to the inner periphery of the main section 211 and has a position-determining lower mold halves 22 and 21 with each other by inserting in aligning the upper and the protrusion 213a into a position-determining hole 22a of the upper mold half 22. The core section 213 has an annular flat surface portion 213b which is formed around the stepped-protrusion 213a and on which an elastomeric material 30, described later, is to be placed. An annular groove 213d is formed around the inner edge of the flat surface portion 213b so as to be used in determining the position of the elastomeric material 30. On the other hand, a conical slope surface portion 213c is formed around and continuous with the outer edge of the flat surface portion 213b so as to be used in the molding of the sealed liquid side surface of the lip tip portion 7. The inner peripheral surface of the projection 25 of the main section 211 has a projecting portion 25a which has a semi-circular section and projects radially inward so as to be used in molding the spring recess 12 of the lip tip portion 7.

Figure 9:
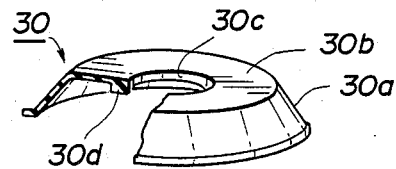
FIG. 9 is a partly-broken-away perspective view of one of the elastomeric materials of FIG. 8.

With the above-described mold 20, the vulcanization molding of the sealing lip is performed in the following way. The metallic ring 3 is first inserted into the recess 23 of the lower mold part 21 with the flange portion 3b facing upward. The cylindrical portion 3a of the metallic ring 3 is brought into contact with the radially outer periphery of the projection 25 of the main section 211 of the lower mold part so as to be centered. Two different elastomeric materials 30 and 31 are placed on the flat surface portion 213b formed on the upper surface of the core section 213 of the lower mold half 21 in a superposed condition. More specifically, these elastomeric materials have different moduli of elasticity, and in the illustrated example, the material that is to form the sealed liquid side surface of the lip tip portion 7 is placed below while the other material that is to form the atmospheric side surface of the lip tip portion 7 is placed above. In other words, although it is desired that the elastomeric material forming the sealed liquid side of the sealing lip portion of the oil seal has a modulus of elasticity or hardness lower than that of the elastomeric material forming the atmospheric side, the present invention is not limited to this relationship. The elastomeric material 30 which is to form the sealed liquid side surface and is placed below in the superposition is previously formed into a shape with a section like a frustum of a cone so as to be able to form the sealed liquid side surface of the lip tip portion 7. More specifically, as shown in FIG. 9, the material 30 has a side surface portion 30a with a predetermined thickness which is made uniform over the entire circumference, and the portion 30a is formed in conformity with the slope surface portion 213c of the core section 213 of the mold 20. A top surface portion 30b of the material 30 has a hole 30c into which the position-determining stepped-protrusion 213a formed on the upper surface of the core section 213 is inserted so that the material 30 can be placed on the flat surface portion 213b on the upper surface of the core section 213 by inserting the stepped-protrusion 213a into the hole 30c. In addition, the material 30 has an annular projection 30d (projecting downward in FIG. 9) formed around the edge of the hole 30c in the top surface portion 30b so that centering of the material can be performed by fitting the annular projection 30d in the annular groove 213d formed around the base of the stepped protrusion 213a on the upper surface of the core section 213. On the other hand, the other elastomeric material 31 that is to form the atmospheric side of the lip tip portion 7 is formed into an annular shape and is in an unvulcanized condition. This material 31 can be fluidized when heated and compressed and can then be hardened by vulcanization.

Figure 10:
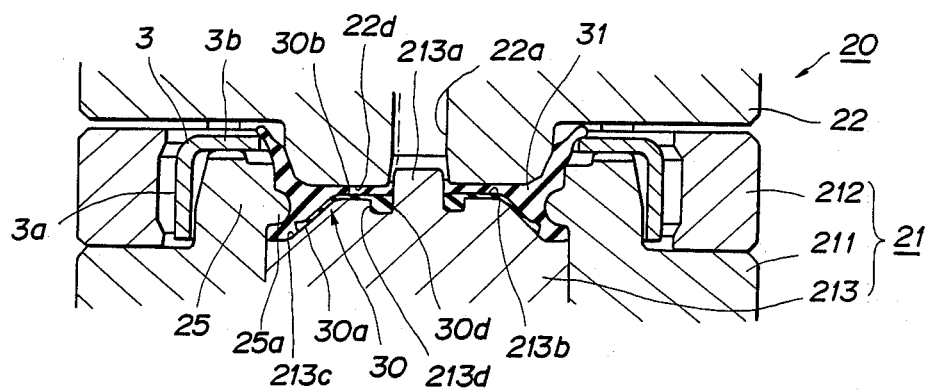
FIG. 10 is a longitudinal sectional view through the mold of FIG. 8, showing an intermediate stage during clamping the mold.
Figure 11:
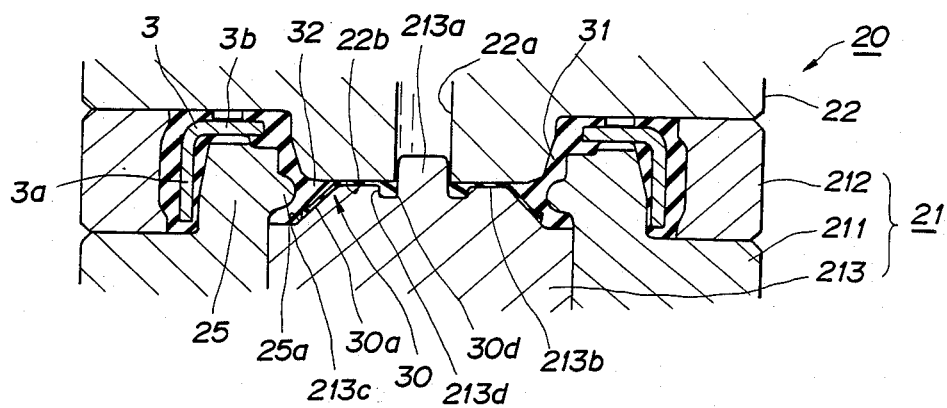
FIG. 11 is a longitudinal sectional view through the mold of FIG. 8, showing the clamped condition of the mold.

As shown in FIGS. 10 and 11, the mold 20 is clamped so as to heat and compress the elastomeric materials 30 and 31 which have been placed on the lower mold half 21. The elastomeric material 31 is then fluidized and fills the entire cavity 24. In this embodiment of the present invention, the elastomeric material 31 that is to form the atmospheric side surface of the lip tip portion 7 is molded in such a manner that it not only forms the lip tip portion 7 but also covers the metallic ring 3 by flowing to the flange portion 3b and forming the outer peripheral rubber portion 5 of the sealing lip 4.

During this compression, the lower surface 22b of the upper mold part 22 is brought into close contact with the top surface portion 30b of the elastomeric material 30 that has been placed on the flat surface portion 213b of the core section 213 and, simultaneously, a portion of the elastomeric material 31 which fills the gap between the lower surface 22b of the upper mold part, which surface partly defines the cavity 24, and the slope surface portion 213c of the core section 213 forms a surplus portion 32 on the atmospheric side of the lip tip portion 7.

Figure 12:
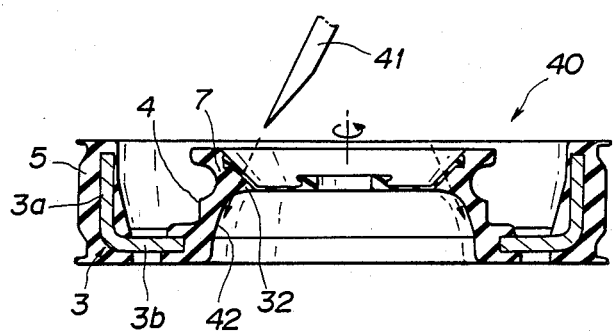
FIG. 12 is a longitudinal sectional view of a compacted structure of the oil seal in the mold after vulcanization molding and just before a surplus portion is cut off from the structure.

After the elastomeric material 31 within the mold 20 has been hardened, the mold is opened and the compacted structure is taken out of the mold 20. The process then proceeds to the formation of the atmospheric side surface of the lip tip portion 7 by cutting off the surplus portion 32 of the compacted structure 40 by means of a knife 41, as shown in FIG. 12. This cutting of the surplus portion 32 is performed, for instance, by using a lathe and cutting off the surplus portion 32 with the knife or scalpel 41 angled at a predetermined angle relative to the axis of rotation while the compacted structure 40 is being rotated with its outer periphery chucked. The atomospheric side of a sealing lip 4 is provided with a relief recess 42 which serves to prevent the tip of the knife 41 from contacting the bridge portion of the sealing lip 4 during the cutting operation.

Figure 13:
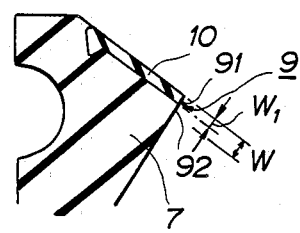
FIG. 13 is a longitudinal sectional view in an enlarged scale through the lip tip portion after the surplus portion has been cut off.

In the lip tip portion 7 which has been subjected to the cutting operation in this way, and is shown on an enlarged scale in FIG. 13, a surface formed by cutting through the side surface portion 30a of the elastomeric material 30 is exposed on the atmospheric side of the lip tip portion 7. Consequently, the sliding surface 9 on the lip tip portion 7 is formed with an area having a width W shown in FIG. 13, and consists of a first sliding surface 91 on the sealed liquid L side, which is formed by a softer elastomeric material with a lower modulus of elasticity, and a second sliding surface 92 on the atmospheric side, which is formed by an elastomeric material with a higher modulus of elasticity. Since the elastomeric material 30 disposed on the sealed liquid side has previously been formed with a predetermined thickness, the width W1 of the first sliding surface 91 on the sealed liquid side can always be formed with a constant value. In addition, since the elastomeric material 30 is formed to have a uniform thickness, it is possible to maintain the width W1 of the first sliding surface 91 on the sealed liquid side at a constant value even when the sliding surface 9 becomes worn after a long period of use, thereby maintaining a constant hydrodynamic pumping action and thus ensuring a good sealing performance over a long period of time while eliminating any problems such as insufficient lubrication of the sliding surface.

The present invention has the construction and effect described above. According to the present invention, the lip tip portion of a sealing lip is vulcanization molded to form an integral structure using different elastomeric materials respectively on the sealed liquid side and the atmospheric side of the lip tip portion while allowing a surplus portion to remain on the atmospheric side, and, thereafter, the atmospheric side surface is formed by cutting off the surplus portion on the atmospheric side. Therefore, in contrast with the prior art in which it has been necessary to axially cut the lip tip portion after a surplus portion extending to the sealed liquid side has been cut in order to make a sliding surface on the lip tip portion formed of two different materials, the present invention enables such double cutting to be eliminated, thereby ahcieving a reduction in the number of processes. In addition, the method of the present invention enables the width of the sliding surface on the sealed liquid side to be formed with a predetermined value in the vulcanization molding, unlike the prior art in which the sliding surface is formed by the cutting that is performed after the molding, which means that the width of the sliding surface may be varied by the cutting. By virtue of eliminating any variation in the width of the sliding surface on the sealed liquid side, the method of the present invention is capable of manufacturing an oil seal which can exhibit a constant sealing performance.

Further, the method of the present invention is capable of molding the elastomeric material on the sealed liquid side into a constant thickness, thus ensuring a constant width of the sliding surface on the sealed liquid side even if the sliding surface becomes worn, thereby enabling that a good lubrication is maintained and achieving an oil seal having a long life.

What is claimed is:

1. A method of manufacturing an oil seal comprising the steps of:

placing two elastomeric materials for forming a sealed liquid side of a sealing lip portion of an oil seal and an atmospheric side thereof in a superposed condition within a mold for vulcanization molding the oil seal, one of said elastomeric materials having a lower modulus of elasticity than the other elastomeric material;

forming a sealed liquid side surface of said sealing lip portion by clamping said mold and compressing said elastomeric materials during vulcanization molding of said elastomeric materials into an integral structure while allowing a surplus portion of said elastomeric material having a lower modulus of elasticity to remain on the atmospheric side of said sealing lip portion;

taking the oil seal from said mold;

forming an atmospheric side surface of said sealing lip portion by cutting off said surplus portion of said elastomeric material on the atmospheric side of said sealing lip portion after compression during the vulcanization molding so that a first relatively soft sliding surface is formed on the sealed liquid side of said sealing lip portion by said elastomeric material having a lower modulus of elasticity and a second sliding surface is formed on the atmospheric side of said sealing lip portion by said other elastomeric material.

2. The method according to claim 1, wherein said elastomeric materials respectively forming the sealed liquid side of the sealing lip portion of said oil seal and the atmospheric side thereof are placed in a superposed condition on the basis of a difference in modulus of elasticity.

3. The method according to claim 1, wherein said elastomeric materials respectively forming the sealed liquid side of the sealing lip portion of said oil seal and the atmospheric side thereof are placed in a superposed condition on the basis of difference in hardness.

4. The method according to claim 1, wherein said surplus portion is cut by means of a knife at a predetermined angle.

* * * * *